(12) United States Patent
Park et al.

(10) Patent No.: US 8,437,436 B2
(45) Date of Patent: May 7, 2013

(54) APPARATUS AND METHOD FOR ESTIMATING CHANNEL IN BROADBAND WIRELESS COMMUNICATION SYSTEM

(75) Inventors: Jeong-Soon Park, Suwon-si (KR); Kyung-Min Kim, Anyang-si (KR); Jong-Han Lim, Seoul (KR); Sung-Soo Kim, Seoul (KR); In-Hyoung Kim, Yongin-si (KR); Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 12/986,700

(22) Filed: Jan. 7, 2011

(65) Prior Publication Data

US 2011/0164709 A1    Jul. 7, 2011

(30) Foreign Application Priority Data

Jan. 7, 2010    (KR) .................... 10-2010-0001185

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC ........... 375/346; 375/350; 375/349; 375/231; 375/232; 375/260; 455/296; 455/307

(58) Field of Classification Search .................. 375/346, 375/350, 349, 231, 232, 260, 316, 219; 455/296, 455/307

See application file for complete search history.

(56) References Cited

U.S. PATENT DOCUMENTS

| | | | | |
|---|---|---|---|---|
| 5,195,106 | A * | 3/1993 | Kazecki et al. | 375/230 |
| 7,149,239 | B2 * | 12/2006 | Hudson | 375/144 |
| 7,848,434 | B2 * | 12/2010 | Wu et al. | 375/260 |
| 2005/0105647 | A1 * | 5/2005 | Wilhelmsson et al. | 375/316 |
| 2006/0227887 | A1 * | 10/2006 | Li et al. | 375/260 |
| 2008/0123516 | A1 * | 5/2008 | Anderson et al. | 370/208 |
| 2008/0139213 | A1 * | 6/2008 | Coersmeier | 455/450 |
| 2009/0245333 | A1 * | 10/2009 | Krishnamoorthi et al. | 375/219 |

* cited by examiner

Primary Examiner — Phuong Phu (57) ABSTRACT

An apparatus and method for channel estimation decrease overhead and hardware complexity while supporting both Wiener-type channel estimation and Finite Impulse Response (FIR) filtering/Infinite Impulse Response (IIR) filtering in a wireless communication system. The apparatus includes a storage unit for storing coefficient sets for a plurality of channel estimation types. A controller selects one of the plurality of channel estimation types according to at least one of a type of a pilot signal and a reliability value of a channel parameter. An N-tap filter, including N multipliers and (N−1) adders, determines channel estimation values of data tones by using the coefficient sets for the selected channel estimation type.

20 Claims, 11 Drawing Sheets

APPARATUS AND METHOD FOR ESTIMATING CHANNEL IN BROADBAND WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 7, 2010 and assigned Serial No. 10-2010-0001185, the entire disclosure of which is hereby incorporated by reference.

TECHNICAL FIELD OF THE INVENTION

The present invention relates to a broadband wireless communication system. More particularly, the present invention relates to an apparatus and method for estimating a wireless channel in the broadband wireless communication system.

BACKGROUND OF THE INVENTION

In the next generation communication system, also known as the $4^{th}$ Generation (4G) communication system, researches are actively in progress to provide various services with Quality of Service (QoS) to users at a data transfer speed of approximately 100 megabit per second (Mbps). In particular, the 4 G communication system is currently being developed to ensure mobility and QoS in a Broadband Wireless Access (BWA) communication system, such as a Wireless Local Area Network (WLAN) system and a Wireless Metropolitan Area Network (WMAN) system. For this reason, Orthogonal Frequency Division Multiplexing (OFDM)/Orthogonal Frequency Division Multiple Access (OFDMA) schemes are receiving attention as signaling of a physical channel.

A precoding scheme may be applied to increase capacity of an OFDMA system. When applying the precoding scheme, a precoding matrix varies on a block basis in a frequency domain. The precoding matrix is multiplied to perform suitable precoding according to a downlink channel experienced by each user or according to a frequency band variation of the channel. Because a user-specific pilot is precoded together with data, 2-dimensional Wiener-type channel estimation using only pilots in a specific block is applied rather than channel estimation used under the premise of the conventionally used cell-specific pilot. Herein, the user-specific pilot may also be referred to as a dedicated reference signal, and the cell-specific pilot may also be referred to as a common pilot.

In the 2-dimensional Wiener-type channel estimation, increasing the block size, may result in better the performance but also adds more complexity. Therefore, it is difficult to implement a Wiener-type channel estimator for a block that includes a specific size or larger. Accordingly, if the block size is large, instead of the 2-dimensional Wiener-type channel estimation, Finite Impulse Response (FIR) filtering/Infinite Impulse Response (IIR) filtering-based channel estimation, which is simple but excellent in capability, may be preferred.

Implementation of both of the Wiener-type channel estimation and the FIR filter/IIR filtering-based channel estimation results in increase of hardware complexity and overhead of controlling in the receiving end. Therefore, there is a need for a method of implementing the Wiener-type channel estimation and the FIR filter/IIR filtering-based channel estimation without increasing the hardware complexity and the overhead of controlling.

SUMMARY OF THE INVENTION

To address the above-discussed deficiencies of the prior art, it is a primary aspect of the present invention to provide an apparatus and method for estimating a channel in a broadband wireless communication system.

Another aspect of the present invention is to provide an apparatus and method for decreasing overhead of controlling and hardware complexity caused by performing channel estimation in a broadband wireless communication system.

Yet another aspect of the present invention is to provide an apparatus and method for supporting both Wiener-type channel estimation and Finite Impulse Response (FIR) filtering/Infinite Impulse Response (IIR) filtering-based channel estimation in a broadband wireless communication system.

According to an aspect of the present invention, an apparatus for estimating a channel in a wireless communication system is provided. The apparatus includes a storage unit for storing coefficient sets for a plurality of channel estimation types, respectively. A controller selects one of the plurality of channel estimation types according to at least one of a type of a pilot signal and a reliability value of a channel parameter. An N-tap filter, including N multipliers and (N−1) adders, determines channel estimation values of data tones by using the coefficient sets for the selected channel estimation type. The plurality of channel estimation types include at least two of a first type including a Wiener type which uses coefficients determined by using Doppler frequency, delay spreading, and noise power, a second type including time-axis linear interpolation, time-axis IIR filtering, frequency-axis linear interpolation, and frequency-axis FIR filtering, and a third type including the time-axis linear interpolation and the frequency-axis linear interpolation.

According to another aspect of the present invention, a method of estimating a channel in a wireless communication system is provided. The method includes selecting one of a plurality of channel estimation types according to at least one of a type of a pilot signal and a reliability value of a channel parameter. Channel estimation values of data tones are determined through an N-tap filter including N multipliers and (N−1) adders to which coefficient sets for the selected channel estimation type is applied. The plurality of channel estimation types include at least two of a first type including a Wiener type which uses coefficients determined by using Doppler frequency, delay spreading, and noise power, a second type including time-axis linear interpolation, time-axis IIR filtering, frequency-axis linear interpolation, and frequency-axis FIR filtering, and a third type including the time-axis linear interpolation and the frequency-axis linear interpolation.

According to yet another aspect of the present invention, an apparatus for estimating a channel in a wireless communication system is provided. The apparatus includes a controller configured to select one of a plurality of channel estimation types according to at least one of a type of a pilot signal and a reliability value of a channel parameter. An N-tap filter determines channel estimation values of data tones by using the coefficient sets for the selected channel estimation type. An operator determines input values of the N-tap filter by performing the time-axis linear interpolation and the IIR filtering using received values of pilot signals when the second type is selected. The channel estimation types include at least two of: 1) a first type that includes a Wiener type which uses coefficients determined by using Doppler frequency, delay spreading, and noise power, 2) a second type that includes time-axis linear interpolation, time-axis Infinite Impulse Response (IIR) filtering, frequency-axis linear interpolation, and frequency-axis Finite Impulse Response (FIR) filtering, and a third type that includes the time-axis linear interpolation and the frequency-axis linear interpolation.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention described below relates to a technique for decreasing overhead of controlling and hardware complexity caused by channel estimation in a broadband wireless communication system. An Orthogonal Frequency Division Multiplexing (OFDM)/Orthogonal Frequency Division Multiple Access (OFDMA)-based wireless communication system will be described hereinafter for exemplary purposes only.

In the following description, for convenience of explanation, a type of estimating channels in a specific block by using dedicated pilots in the block may be referred to as a Wiener type or a first type, and a type of using common pilots may be referred to as a Finite Impulse Response (FIR) filtering/Infinite Impulse Response (IIR) filtering type or a second type.

First, a frame structure of a system will be described according to an embodiment of the present invention.

Figure 1:
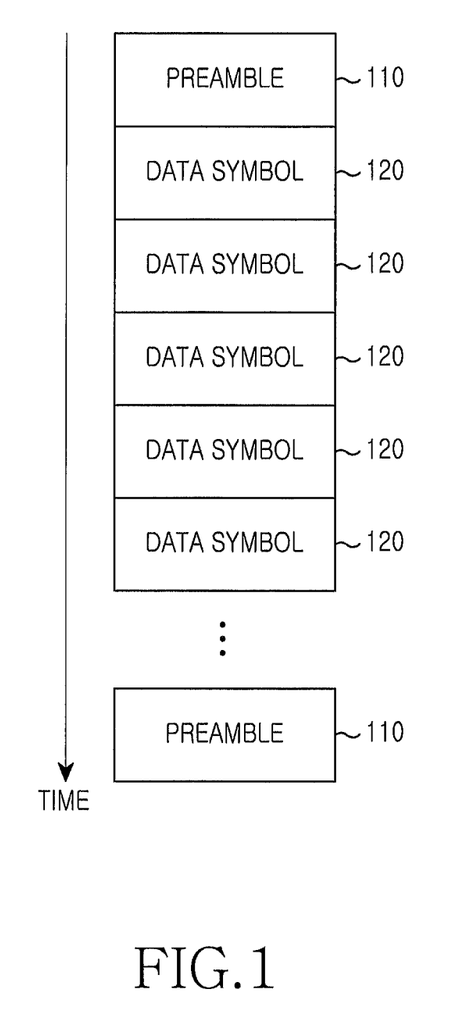
FIG. 1 is a schematic view illustrating a frame structure of a broadband wireless communication system according to an embodiment of the present invention.

FIG. 1 is a schematic view illustrating a frame structure of a broadband wireless communication system according to an embodiment of the present invention. Referring to FIG. 1, a frame includes a preamble symbol 110 and data symbols 120. The preamble symbol 110 is used for frequency synchronization, timing synchronization, and channel estimation, and is a signal that is pre-known to a transmitting end and a receiving end. The data symbols 120 are used for data transmission. Some subcarriers are used to transmit pilot signals, and the remaining subcarriers are used to transmit data signals. In this situation, the pilot signals and the data signals are distributed as illustrated in FIG. 2

Figure 2:
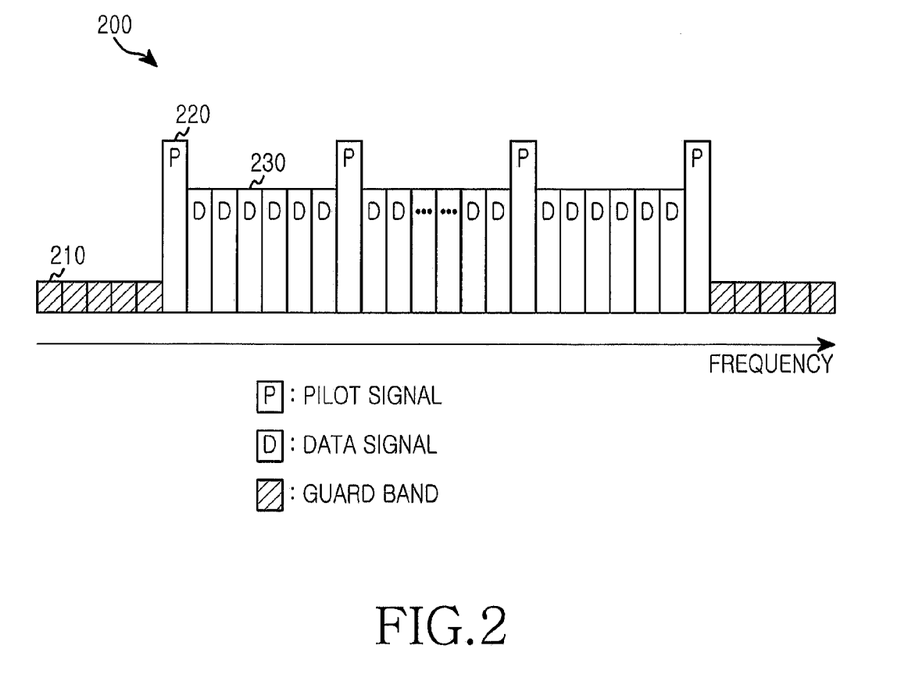
FIG. 2 illustrates a distribution of pilot signals and data signals in a broadband wireless communication system according to an embodiment of the present invention.

FIG. 2 illustrates a distribution of pilot signals and data signals in a broadband wireless communication system according to an embodiment of the present invention. Referring to FIG. 2, a data symbol 200 includes guard bands 210, pilot signals 220, and data signals 230. The guard bands 210 are located in the outermost band. The pilot signals 220 are equidistantly arranged between the data signals 230.

First, structures of channel estimation of the first type and channel estimation of the second type of the present invention will be described in brief.

Figure 3:
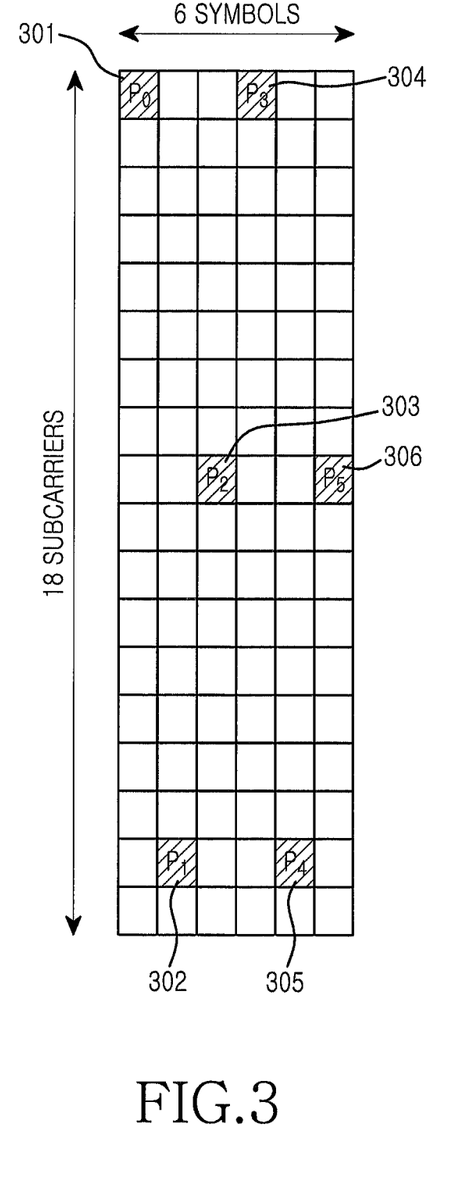
FIG. 3 illustrates a block including dedicated pilots in a broadband wireless communication system according to an embodiment of the present invention.
Figure 4:
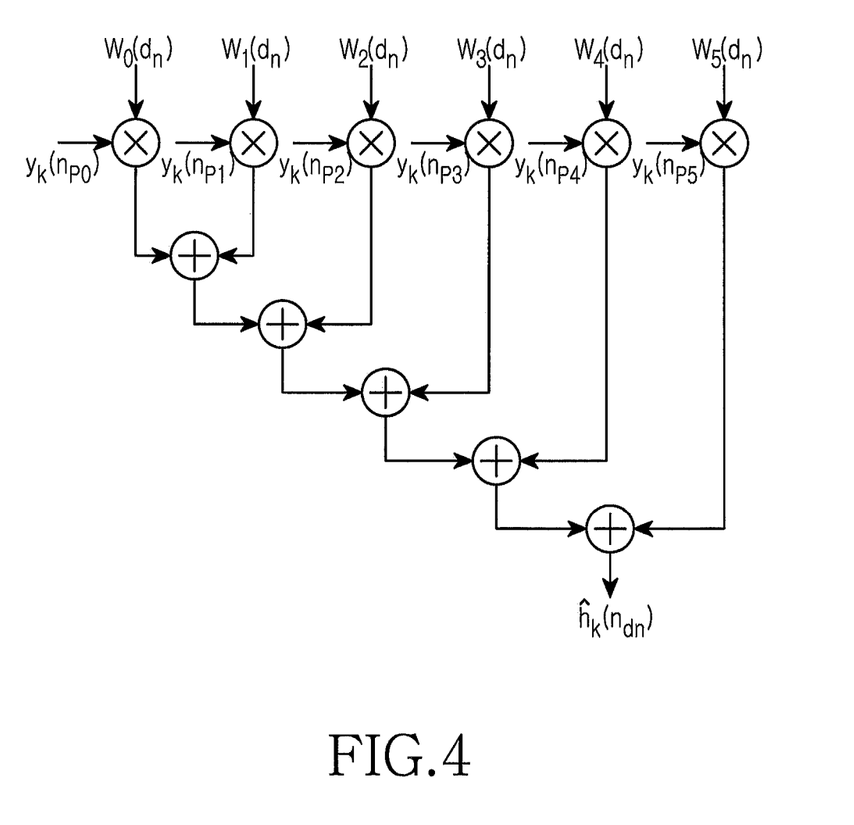
FIG. 4 illustrates a configuration of first-type channel estimation in a broadband wireless communication system according to an embodiment of the present invention.

Distribution of pilot signals of FIG. 3 is assumed to describe an operation of the first type. FIG. 3 illustrates a block including dedicated pilots in a broadband wireless communication system according to an embodiment of the present invention. Referring to FIG. 3, the block is located across 6 symbols in a time axis and 18 subcarriers in a frequency axis, and includes 6 dedicated pilot signals $P_0$ to $P_5$ indicated by 301 to 306. In this situation, if received values of the dedicated pilot signals are denoted by $y_0$ to $y_5$, a channel value of a data tone is estimated as illustrated in FIG. 4. Herein, the received value of the dedicated pilot signal implies a channel value of a tone in which the dedicated pilot signal is located.

FIG. 4 illustrates a configuration of first-type channel estimation in a broadband wireless communication system according to an embodiment of the present invention. Referring to FIG. 4, when determining a channel estimation value of an $n^{th}$ data tone (i.e., $d_n$), a receiving end multiplies coefficients $w_0(d_n)$ to $w_5(d_n)$ for the $d_n$ by the aforementioned values $y_0$ to $y_5$, respectively, and adds up values obtained as a result of multiplication. Accordingly, channel estimation values of all data tones are determined.

In this situation, the coefficients for the $n^{th}$ data tone are required by the number of the dedicated pilot signals and are determined according to a positional relation of pilot tones, noise power, a Doppler frequency, delay spreading, and such. For example, the coefficients are determined by Equation (1) below.

$$W = R_{yx} R_{xx}^{-1},$$ [Eqn. 1]

$$w_i(d_n) = W_{d_n,i}$$

$$R_t(n) = j_0(2\pi f_d n T_s)$$

$$R_f(k) = \frac{1}{1 + j2\pi k \Delta f \tau_{RMS}}$$

$$(R_{yx})_{ij} = R_f(k_{d_i} - k_{P_j}) \times R_t(n_{d_i} - n_{P_j})$$

if $i = j$, $(R_{xx})_{ij} = 1 + \sigma^2$ else $(R_{yx})_{ij} = R_f(k_{P_i} - k_{P_j}) \times R_t(n_{P_i} - n_{P_j})$ In Equation 1, above, W denotes a weight set, $R_{yx}$ denotes a cross-correlation between a data subcarrier and a pilot subcarrier to be estimated, $R_{xx}$ denotes an autocorrelation between pilot subcarriers, $w_i(d_n)$ denotes an $i^{th}$ weight corresponding to an $n^{th}$ data tone, $W_{d_n,i}$ denotes an $i^{th}$ element of the weight set corresponding to the $n^{th}$ data tone, $R_t$ denotes a time-axis correlation, $f_d$ denotes a Doppler frequency estimation value, $T_s$ denotes a symbol spacing, $R_f$ denotes a frequency-axis correlation, k denotes a subcarrier spacing, $\tau_{RMS}$ denotes a delay spread estimation value, and $\sigma^2$ denotes noise power.

That is, $R_{xx}$ and $R_{yx}$ are denoted by the product of $R_t$ and $R_f$, where $R_t$ is determined from the Doppler frequency estimation value $f_d$ and $R_f$ is determined from the delay spread estimation value $\tau_{RMS}$. In this situation, the subcarrier spacing k and the symbol spacing $T_s$ are determined on the basis of positions of a symbol and a subcarrier of a pilot and data.

Figure 5:
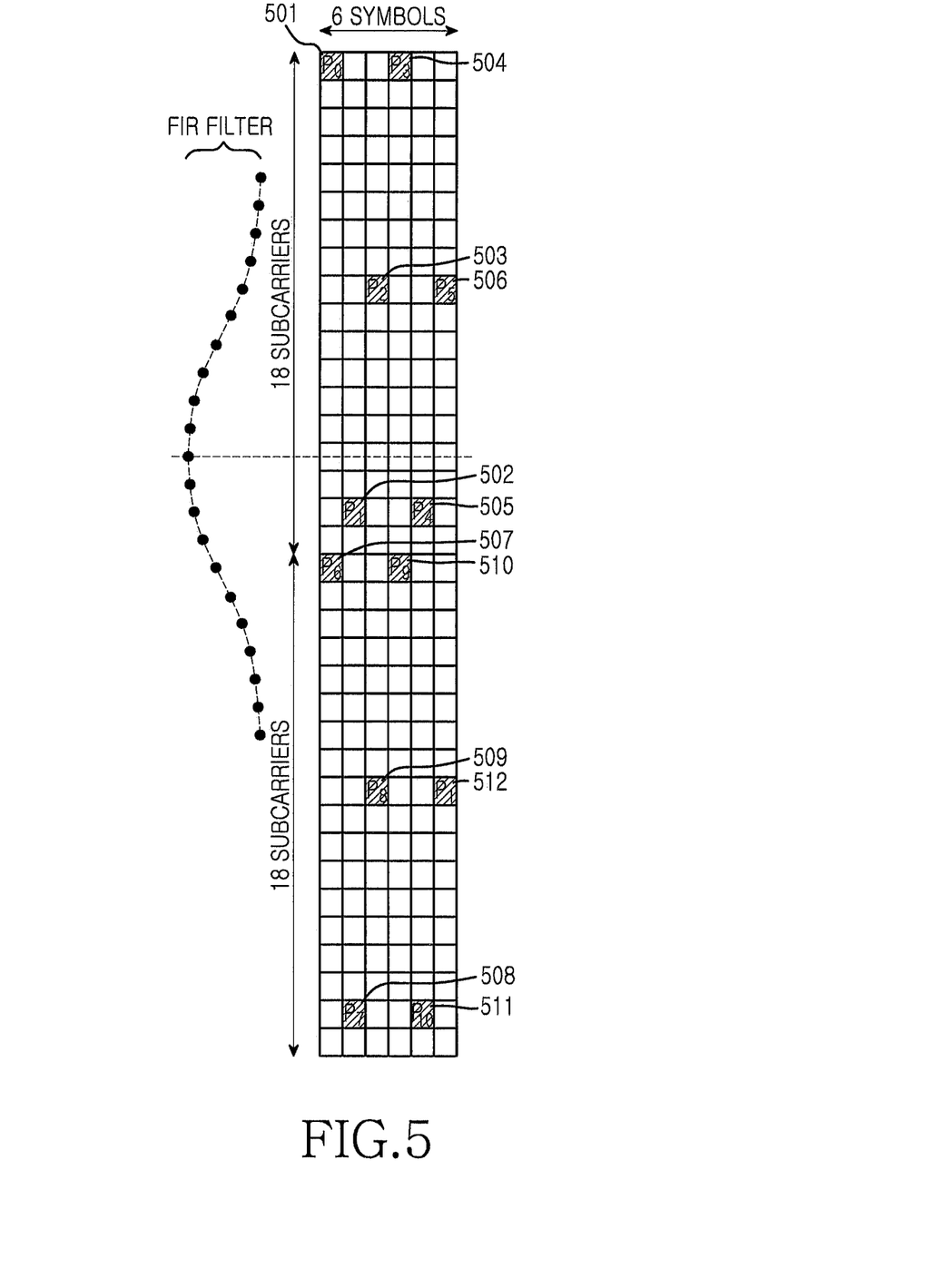
FIG. 5 illustrates a distribution of common pilots in a broadband wireless communication system according to an embodiment of the present invention.
Figure 6A:
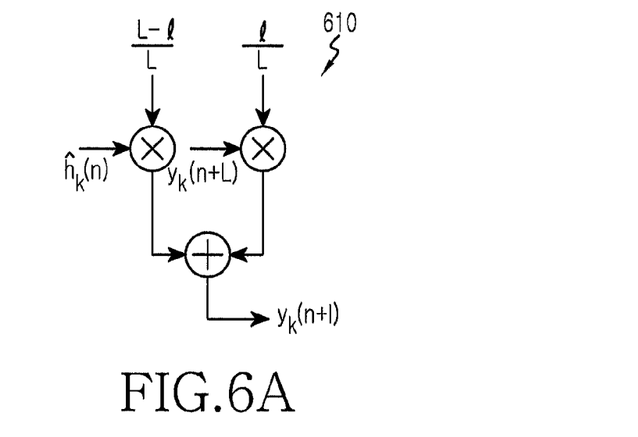
FIGS. 6A-6D illustrates a configuration of second-type channel estimation in a broadband wireless communication system according to an embodiment of the present invention.
Figure 6B:
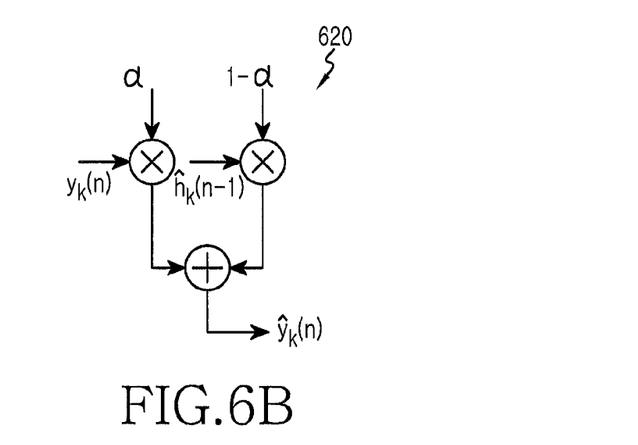
Figure 6C:
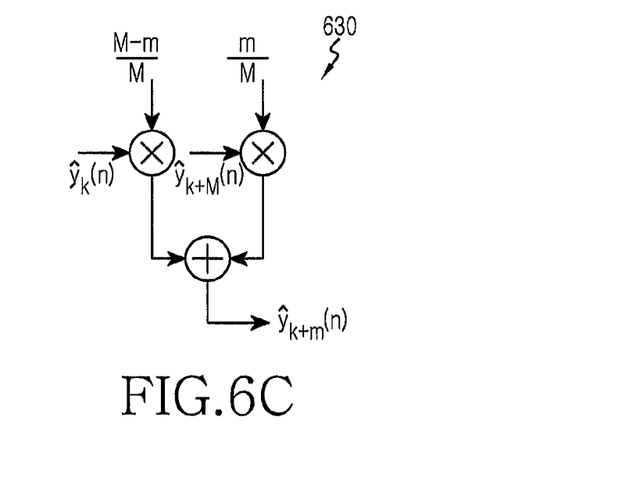
Figure 6D:
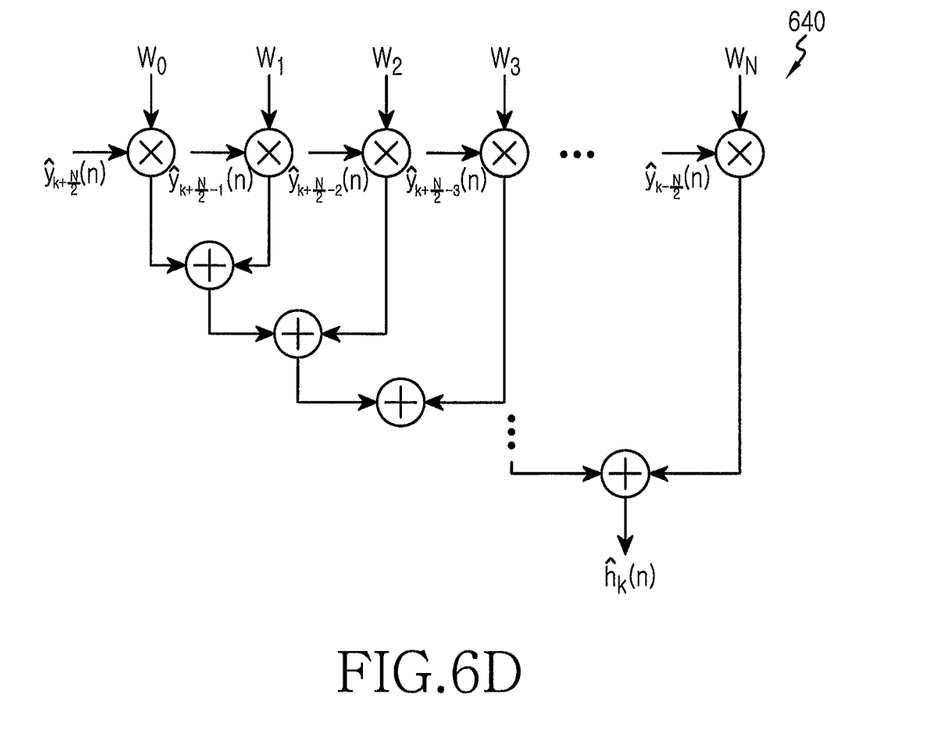

To explain an operation of the second type, it is assumed that pilot signals are distributed as illustrated in FIG. 5. FIG. 5 illustrates a distribution of common pilots in a broadband wireless communication system according to an embodiment of the present invention. Referring to FIG. 5, a block of performing channel estimation is located across 6 symbols in a time axis and 36 subcarriers in a frequency axis. Each block includes 12 common pilot signals $P_0$ to $P_{11}$ indicated by 501 to 512. The second-type channel estimation may be performed in a wider range than that illustrated in FIG. 5 above. In this situation, if received values of the dedicated pilot signals are denoted by $y_0$ to $y_5$, a channel value of a data tone is estimated as illustrated in FIG. 6.

FIG. 6 illustrates a configuration of second-type channel estimation in a broadband wireless communication system according to an embodiment of the present invention. Referring to FIG. 6A, a receiving end performs a time-axis linear interpolation operation 610 by using received values of pilot signals located in the same subcarrier so as to determine channel estimation values of data tones of the subcarrier including the pilot signals. That is, a received value of a pilot signal of a $k^{th}$ subcarrier and an $n^{th}$ symbol is multiplied by (L−l)/L, a received value of a pilot signal of the $k^{th}$ subcarrier and an $(n+l)^{th}$ symbol is multiplied by l/L, and then the multiplication results are added up to determine a channel estimation value of a data tone of the $k^{th}$ subcarrier and the $(n+l)^{th}$ symbol. As illustrated in FIG. 6B, the receiving end performs an IIR filtering operation 620 on the channel estimation values determined by performing the time-axis linear interpolation operation. The IIR filtering operation 620 is one type of accumulated averaging operations. That is, a channel estimation value of the $k^{th}$ subcarrier and the $n^{th}$ symbol is multiplied by α, a channel estimation value of the $k^{th}$ subcarrier and an $(n-1)^{th}$ symbol is multiplied by (α−1), and then the multiplication results are added up to filter a channel estimation value of a data tone of the $k^{th}$ subcarrier and the $n^{th}$ symbol. Accordingly, a channel estimation operation is complete in the time axis. Thereafter, as illustrated in FIG. 6C, the receiving end determines channel estimation values of the remaining data tones by performing a frequency-axis linear interpolation operation 630. That is, a channel estimation value of the $k^{th}$ subcarrier and the $n^{th}$ symbol is multiplied by (M−m)/M, a channel estimation value of a $(k+M)^{th}$ subcarrier and the $n^{th}$ symbol is multiplied by m/M, and then the multiplication results are added up to determine a channel estimation value of a $(k+m)^{th}$ subcarrier and the $n^{th}$ symbol. In addition, as illustrated in FIG. 6D, the receiving end performs an FIR filtering operation 640 on channel estimation values determined by the frequency-axis linear interpolation. The FIR filtering operation 640 is one type of Low Pass Filtering (LPF) operations. In this situation, channel estimation values of a specific number of upper/lower subcarriers are used with respect to a subcarrier to be filtered. That is, if it is intended to filter a channel estimation value of the $k^{th}$ subcarrier and the $n^{th}$ symbol, (N+1) channel estimation values, e.g., a $(k+(N/2))^{th}$ subcarrier to a $(k-(N/2))^{th}$ subcarrier, and such, are used. More specifically, the receiving end multiplies the (N+1) channel estimation values by coefficients $w_0$ to $w_N$, and then adds up the multiplication results. Accordingly, channel estimation values of all data tones are determined. Herein, coefficients for the FIR filtering are determined based on time coherence and frequency coherence, and are constant irrespective of a subcarrier position.

The processes illustrated in FIG. 6A to FIG. 6D are performed on a symbol basis. Accordingly, when performing the time interpolation on the remaining symbols other than the first symbol, a value obtained by performing the frequency interpolation and the FIR filtering is used.

In the first type, received values of dedicated pilot signals are multiplied by coefficients and the multiplication results are added up. In the second type, the linear interpolation, the IIR filtering, and the FIR filtering are performed on common pilot signals. In addition thereto, channel estimation may be possible by performing the linear interpolation on the dedicated pilot signals, which is referred to as a third type. According to the third type, similarly to the second type, the receiving end performs the time-axis linear interpolation by using the received values of the dedicated pilot signals located in the same subcarrier, and then determines channel estimation values of data tones by performing the frequency-axis linear interpolation.

The first, second, and third types have different computational complexities, and require different numbers of multipliers. The number of multipliers required in the first type is equal to the number of pilot signals included in a block. The number of multipliers required in the second type is equal to the number of coefficients necessary for the FIR filtering. The number of multipliers required in the third type is equal to a greater value between the number of pilot signals included in one subcarrier and the number of pilot signals included in one symbol. Because the number of pilot signals included in one subcarrier, one symbol, and one block is limited, the number of coefficients necessary for the FIR filtering is the greatest in general. Therefore, the second type requires the greatest number of multipliers.

Because each type has a different computation method and a different number of multipliers, three types of channel estimation devices may be required to support all of the three types of channel estimation. The present invention proposes a technique for supporting all of the three types of channel estimation by properly regulating coefficients by the use of one hardware component.

The present invention is based on an ideal in which the three types share a configuration of the first type in such a manner that a received value of a pilot signal obtained by performing the FIR filtering, the linear interpolation is multiplied by a specific number of coefficients, and then the multiplication results are summed up. Accordingly, the frequency-axis FIR filtering can be performing on common pilot signals by using a smaller number of multipliers, and the time-axis linear interpolation and the frequency-axis linear interpolation can also be performed on dedicated pilot signals in one operation.

The second-type channel estimation is performed by using the configuration of the first type on the technical basis as described below.

Because the first type performs block-basis processing and the second type performs symbol-basis processing, a processing unit preferably conforms to the first type which requires a relatively smaller size. As described above, the second type determines channel estimation values of a full band on a symbol basis, and thus resultant values of the frequency-axis interpolation are used for the time-axis linear interpolation and the IIR filtering. However, when performing the time-axis linear interpolation and the IIR filtering by using pilot signals before channel estimation values of the full band of one symbol are obtained, it is more similar to the configuration of the first type, and thus the time-axis linear interpolation and the IIR filtering are performed in one operation. That is, unlike the second type in which channel estimation is performed on a symbol basis, the receiving end performs both of the time-axis linear interpolation and the IIR filtering on subcarriers on which all pilot signals are located, and then performs the frequency-axis interpolation and the FIR filtering on a symbol basis. The time-axis IIR filtering has to maintain an effect of obtaining an average in the time axis, and thus, performance deterioration does not occur even if received values of pilot signals are used instead of using final channel estimation values which have undergone the frequency-axis FIR filtering.

The frequency-axis linear interpolation and the FIR filtering are as follows. The frequency-axis linear interpolation is used to determine channel estimation values which are not determined between pilot signals in an area where the FIR filtering is performed. That is, channel estimation values determined by performing the linear interpolation are used as an input of the FIR filtering. For example, an operation of performing the FIR filtering on a channel estimation value of a $14^{th}$ subcarrier is expressed by Equation 2, below.

$$\hat{h}_{14}(0) = w_{20}\hat{y}_4(0) + w_{19}\hat{y}_5(0) + \ldots + w_0\hat{y}_{24}(0) \quad [\text{Eqn. 2}]$$

In Equation 2, above, $\hat{h}_{14}(0)$ denotes a value obtained as a result of FIR filtering performed on a tone of a $14^{th}$ subcarrier and a $0^{th}$ symbol. That is, $\hat{h}_{14}(0)$ denotes a channel estimation value, $w_i$ denotes an $i^{th}$ filter coefficient, and $\hat{y}_k(0)$ denotes a value obtained as a result of time-axis linear interpolation, IIR filtering, and frequency-axis linear interpolation performed on a tone of a $k^{th}$ subcarrier and the $0^{th}$ symbol.

Equation is expressed by the product between 21 filter coefficients $W_i$ and resultant values of the frequency-axis linear interpolation. Because this is an operation performed on a subcarrier basis, 21 multipliers are required. Equation 2 may be summarized in Equation 3, below, by using channel estimation values of an IIR-filtered pilot tone.

$$h_{14}(0) = w_{20}\left(\frac{4}{8}\hat{y}_0(0) + \frac{4}{8}\hat{y}_8(0)\right) + \ldots + w_0\left(\frac{4}{8}\hat{y}_{18}(0) + \frac{4}{8}\hat{y}_{26}(0)\right) = \quad [\text{Eqn. 3}]$$

$$\left(\frac{4}{8}w_{20} + \frac{3}{8}w_{19} + \frac{2}{8}w_{18} + \frac{1}{8}w_{17}\right)\hat{y}_0(0) + \ldots +$$

$$\left(\frac{1}{8}w_5 + \frac{2}{8}w_4 + \frac{3}{8}w_3 + \frac{4}{8}w_2 + \frac{5}{8}w_1 + \frac{6}{8}w_0\right)\hat{y}_{26}(0)$$

In Equation 3, $h_{14}(0)$ denotes a channel estimation value of a tone of a $14^{th}$ subcarrier and a $0^{th}$ symbol, $w_i$ denotes an $i^{th}$ filter coefficient, and $\hat{y}_k(0)$ denotes a value obtained as a result of time-axis linear interpolation, IIR filtering, and frequency-axis linear interpolation performed on a tone of a $k^{th}$ subcarrier and a $0^{th}$ symbol.

Equation 3 may be interpreted as a format in which seven (7) coefficients are multiplied by channel estimation values of the IIR-filtered pilot tone. Therefore, when using seven coefficients obtained by considering the frequency-axis linear interpolation coefficients and FIR filter coefficients for each subcarrier, the number of required multipliers is decreased from the number of FIR filtering coefficients to the number of pilot signals influenced by an FIR filter. In Equation 3, respective combinations of coefficients $w_i$ multiplied by respective values $\hat{y}_k(0)$ are new coefficients. However, with respect to the second type, the FIR filtering coefficients are constant irrespective of a subcarrier position, but if the coefficients are decreased, the coefficients are changed depending on a subcarrier. Therefore, a coefficient set should be defined for each subcarrier. While there is no overhead in a storage amount, the number of multipliers required for the FIR filtering is significantly decreased. Therefore, there is an advantage in that hardware complexity is decreased.

The third-type channel estimation is performed by using the configuration of the first type based on the technical description below.

For example, a channel estimation value of an $11^{th}$ subcarrier and a $3^{rd}$ symbol is determined by performing the time-axis linear interpolation and the frequency-axis linear interpolation, and can be expressed by Equation 4, below.

$$\hat{h}_{11}(3) = \frac{5}{8}\left(\frac{2}{3}y_8(2) + \frac{1}{3}y_8(5)\right) + \frac{3}{8}\left(\frac{1}{3}y_{16}(1) + \frac{2}{3}y_{16}(4)\right) = \quad [\text{Eqn. 4}]$$

$$\frac{5}{12}y_8(2) + \frac{5}{24}y_8(5) + \frac{1}{8}y_{16}(1) + \frac{1}{4}y_{16}(4)$$

In Equation 4, $\hat{h}_{11}(3)$ denotes a value obtained as a result of FIR filtering performed on a tone of the $11^{th}$ subcarrier and the $3^{rd}$ symbol. That is, $\hat{h}_{11}(3)$ denotes a channel estimation value, and $y_k(n)$ denotes a value obtained as a result of time-axis linear interpolation, IIR filtering, and frequency-axis linear interpolation performed on a tone of a $k^{th}$ subcarrier and an $n^{th}$ symbol.

That is, as illustrated in Equation 4, the third-type channel estimation can be interpreted as an operation of multiplying received values of pilot signals in a block and coefficients for a corresponding tone, similarly to the second type. That is, the receiving end defines coefficient sets corresponding to respective data tones in the block and selectively uses a coefficient set corresponding to a data tone which intends to determine a channel estimation value, and thus can determine channel estimation value of the data tone from the received values of the pilot signals. In Equation 4, weights multiplied by respective values $y_k(n)$ are new coefficients.

The present invention described hereinafter relates to a structure and operation of a receiving end for estimating a channel as described above.

Figure 7:
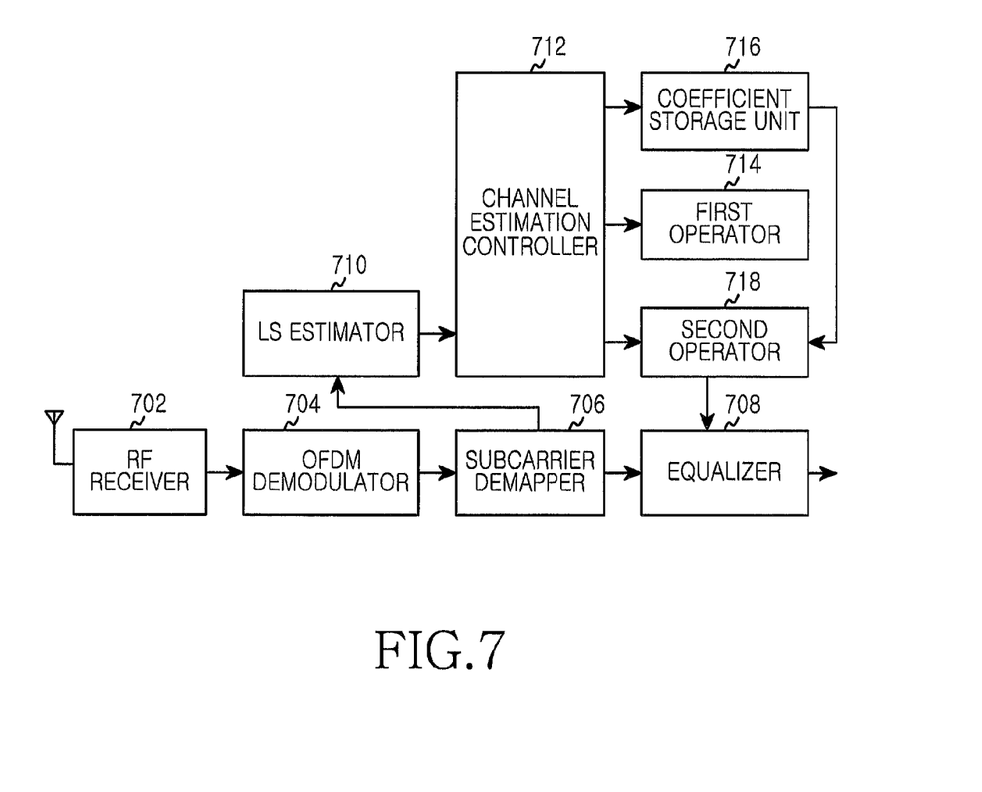
FIG. 7 illustrates a structure of a receiving end in a broadband wireless communication system according to an embodiment of the present invention.

FIG. 7 illustrates a structure of a receiving end in a broadband wireless communication system according to an embodiment of the present invention.

Referring to FIG. 7, the receiving end includes a Radio Frequency (RF) receiver 702, an OFDM demodulator 704, a subcarrier demapper 706, an equalizer 708, a Least Square (LS) estimator 710, a channel estimation controller 712, a first operator 714, a coefficient storage unit 716, and a second operator 718.

The RF receiver 702 down-converts an RF signal received through an antenna into a baseband signal. The OFDM demodulator 704 fragments the baseband signal on an OFDM symbol basis and restores signals mapped to subcarriers by performing a fast Fourier transform (FFT) operation. The subcarrier demapper 706 outputs the signals mapped to the subcarriers by separating the signals in a processing unit. The subcarrier demapper 706 provides the LS estimator 710 with pilot signals included in a data symbol, and provides the equalizer 708 with data signals included in the data symbol. The equalizer 708 compensates for distortion of data signals by using final channel estimation values of data tones provided from the second operator 718. The LS estimator 710 determines channel values of pilot tones by using received values of the pilot signals provided from the subcarrier demapper 706 and provides the channel estimation controller 712 with the channel values of the pilot tones.

The channel estimation controller 712 determines a channel estimation type and controls the first operator 714, the coefficient storage unit 716, and the second operator 718 to conform to the determined type. According to an embodiment of the present invention, the equalizer 708 determines the channel estimation type according to a type of a pilot signal and reliability of a channel parameter. The type of the pilot signal includes a common pilot and a dedicated pilot, and the channel parameter includes a Doppler frequency, delay spreading, noise power, and such. The reliability of the channel parameter is determined by the number of samples used to obtain the channel parameter, a variation of the channel parameter value, and such. That is, the reliability is increased in proportion to the number of samples used to obtain the channel parameter and in inverse proportion to the variation of the channel parameter value. If the pilot signals provided from the subcarrier demapper 706 are common pilots, the channel estimation controller 712 determines to estimate a channel according to the second type. In addition, if the pilot signals provided from the subcarrier demapper 706 are dedicated pilots, when the reliability of the channel parameter is greater than or equal to a threshold, the channel estimation controller 712 determines to estimate the channel according to the first type, and when the reliability of the channel parameter is less than the threshold, the channel estimation controller 712 determines to estimate the channel according to the third type.

The first operator 714 is an entity for the second-type channel estimation and performs time-axis interpolation and IIR filtering. That is, the first operator 714 performs the time-axis interpolation by using received values of pilot signals included in the same subcarrier, and performs the IIR filtering on values obtained from the time-axis interpolation by using an attenuation coefficient $\alpha$.

Figure 8:
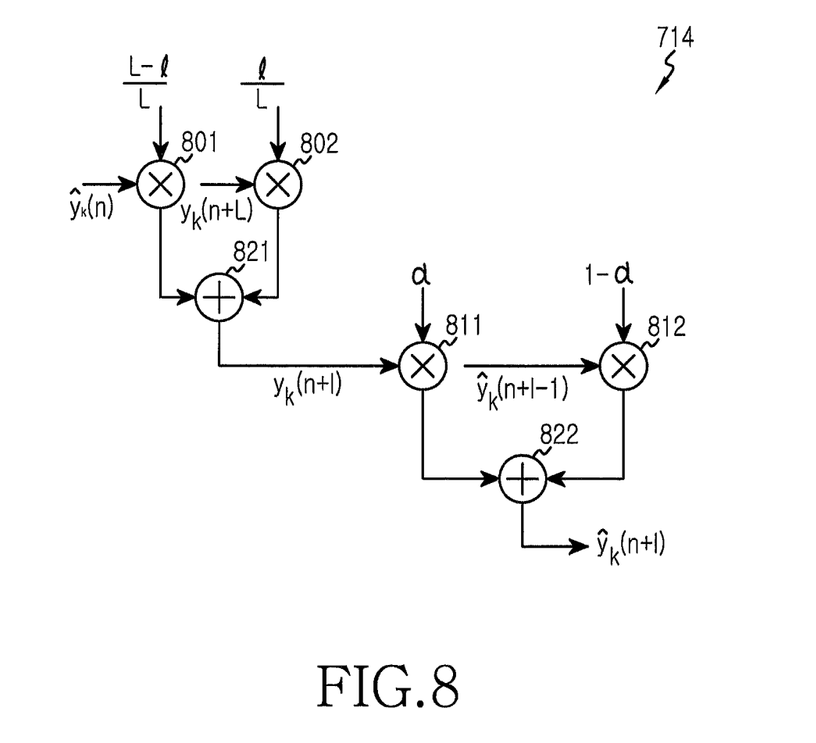
FIG. 8 illustrates an example of a detailed structure of a first operator of a receiving end in a broadband wireless communication system according to an embodiment of the present invention.

FIG. 8 illustrates an example of a detailed structure of the first operator 714 according to an embodiment of the present invention. Referring to FIG. 8, the first operator 714 includes multipliers 801 and 802 for time-axis interpolation, multipliers 811 and 812 for IIR filtering, and also includes adders 821 and 822. The multipliers 801 and 802 for the time-axis interpolation multiply a received value of a pilot signal of a $k^{th}$ subcarrier and an $n^{th}$ symbol and a received value of a pilot signal of the $k^{th}$ subcarrier and an $(n+1)^{th}$ symbol by $(L-l)/L$ and $l/L$, respectively. A first adder 821 calculates a channel estimation value of a data tone of the $k^{th}$ subcarrier and the $(n+1)^{th}$ symbol by adding up outputs of the multipliers 801 and 802 for the time-axis interpolation and provides the channel estimation value of the data tone of the $k^{th}$ subcarrier and the $(n+1)^{th}$ symbol to one of the multipliers 811 and 812 for the IIR filtering. Furthermore, the multipliers 811 and 812 for the IIR filtering multiply the channel estimation value of the tone of the $k^{th}$ subcarrier and the $(n+1)^{th}$ symbol and a channel estimation value of a tone of the $k^{th}$ subcarrier and the $(n+L-1)^{th}$ symbol by $\alpha$ and $(1-\alpha)$, respectively. In addition, a second adder 822 determines a channel estimation value of a tone of the IIR-filtered $k^{th}$ subcarrier and $(n+1)^{th}$ symbol by adding up outputs of the multipliers 801 and 802 for the IIR filtering. Channel estimation values of all tones of a subcarrier including a pilot symbol are determined by the first operator 714. However, the channel estimation values determined by the first operator 714 are not final channel estimation values. These values are subjected to FIR filtering by means of the second operator 718, and thereafter, the final channel estimation values are obtained.

The coefficient storage unit 716 stores coefficient sets corresponding to positions of respective tones according to the first type, the second type, and the third type, and provides the second operator 718 with the stored coefficient sets under the control of the channel estimation controller 712. In other words, the coefficient storage unit 716 provides the second operator 718 with the coefficient sets corresponding to the channel estimation type and a position of a data tone which intends to determine a channel estimation value provided from the channel estimation controller 712. For example, coefficient sets conforming to the first type are determined according to Equation 1, coefficient sets conforming to the second type are determined according to Equation 3, and coefficient sets conforming to the third type are determined according to Equation 4.

The second operator 718 determines final channel estimation values of data tones according to the channel estimation type indicated by the channel estimation controller 712. When conforming to the first type, received values of pilot signals are provided from the channel estimation controller 712 to the second operator 718. In addition, a position of a data tone which intends to determine a channel estimation value and coefficient sets corresponding to the first type are provided from the coefficient storage unit 716 to the second operator 718. Thereafter, the second operator 718 determines a final channel estimation value of the data tone by performing N-tap filtering by the use of the coefficient set. When conforming to the second type, channel estimation values of some data tones included in the same symbol are provided from the first operator 714 to the second operator 718. Furthermore, a position of a data tone which intends to determine a channel estimation value and coefficient sets corresponding to the second type are provided from the coefficient storage unit 716 to the second operator 718. Thereafter, the second operator 718 determines a final channel estimation value of the data tone by performing N-tap filtering by the use of the coefficient set. When conforming to the third type, received values of pilot signals are provided from the channel estimation controller 712 to the second operator 718. Moreover, a position of a data tone which intends to determine a channel estimation value and coefficient sets corresponding to the third type are provided from the coefficient storage unit 716 to the second operator 718. Thereafter, the second operator 718 determines a final channel estimation value of the data tone by performing N-tap filtering by the use of the coefficient set.

Figure 9:
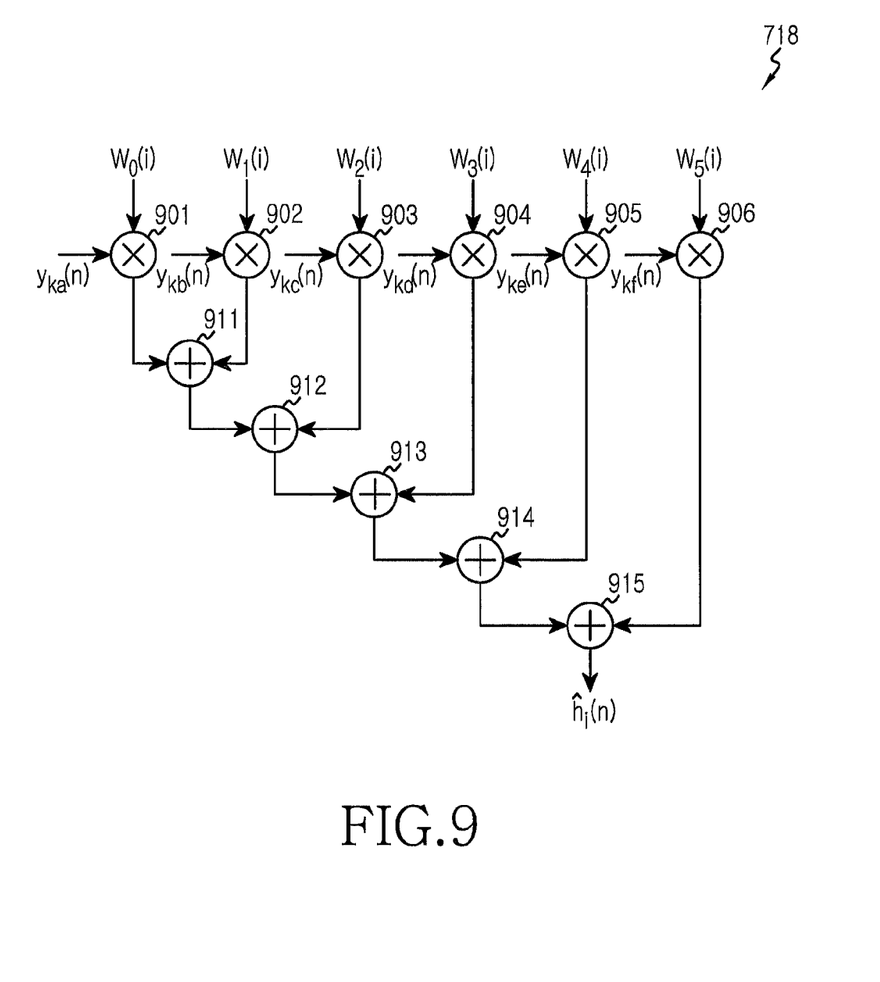
FIG. 9 illustrates an example of a detailed structure of a second operator of a receiving end in a broadband wireless communication system according to an embodiment of the present invention.

FIG. 9 illustrates an example of a detailed structure of the second operator 718 according to an embodiment of the present invention. Referring to FIG. 9, the second operator 718 includes six (6) multipliers 901 to 906 and five (5) adders 911 to 915. In FIG. 9, the number of multipliers included in the second operator 718 is six because the number of dedicated pilot signals in one block is six. The number of multipliers included in the second operator 718 may vary according to the number of dedicated pilot signals in the block. Referring to FIG. 9, each of the multipliers 901 to 906 performs multiplication between one of the coefficients included in a coefficient set and one of input values provided from the channel estimation controller 712 or the first operator 714, and the adders 911 to 916 add up output values of the multipliers 901 to 906. That is, although the second operator 718 has the same structure in all embodiments, channel estimation values conforming to the first type, the second type, and the third type are determined according to input coefficient sets and input values.

If the channel estimation controller 712 determines to apply the first type, the channel estimation controller 712 reports positions of data tones, which intend to determine the channel estimation values, to the coefficient storage unit 716 and provides received values of pilot signals to the second operator 718. Accordingly, the coefficient storage unit 716 provides the second operator 718 with the first-type coefficient sets corresponding to the respective data tones, and determines the channel estimation value conforming to the first type by using the received values of the pilot signals and the coefficient sets for the first type.

If the channel estimation controller 712 determines to apply the second type, the channel estimation controller 712 reports positions of data tones, which intend to determine the channel estimation values, to the coefficient storage unit 716 and provides received values of pilot signals to the first operator 714. Accordingly, the first operator 714 performs time-axis linear interpolation and IIR filtering by using the received values of the pilot signals, and thus determines values obtained as a result of the linear interpolation and IIR filtering performed on all symbols of a subcarrier on which the pilot signals are located. Furthermore, the first operator 714 provides the second operator 718 with the resultant values of the linear interpolation and IIR filtering. Moreover, the coefficient storage unit 716 provides the second operator 718 with second-type coefficient sets corresponding to the respective data tones and determines channel estimation values conforming to the second type by using the coefficient sets for the second type and the resultant values of the linear interpolation and IIR filtering.

If the channel estimation controller 712 determines to apply the third type, the channel estimation controller 712 reports positions of data tones, which intend to determine the channel estimation values, to the coefficient storage unit 716, and provides received values of pilot signals to the second operator 718. Accordingly, the coefficient storage unit 716 provides the second operator 718 with third-type coefficient sets corresponding to the respective data tones and determines channel estimation values conforming to the third type by using the coefficient sets for the third type and the resultant value of the linear interpolation and IIR filtering.

Figure 10:
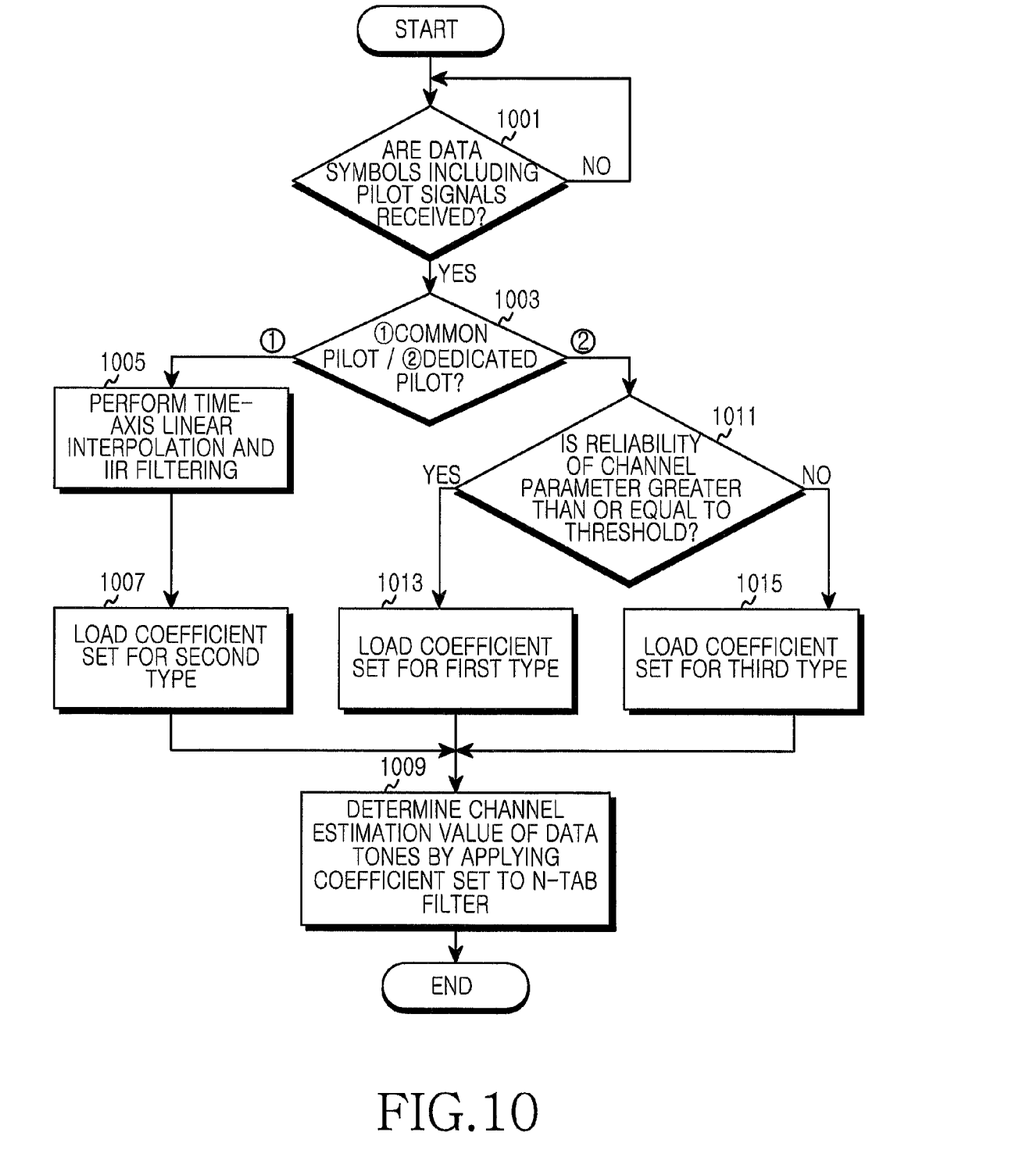
FIG. 10 illustrates a channel estimation process of a receiving end in a broadband wireless communication system according to an embodiment of the present invention.

FIG. 10 illustrates a channel estimation process of a receiving end in a broadband wireless communication system according to an embodiment of the present invention.

Referring to FIG. 10, the receiving end determines whether data symbols including pilot signals are received in block 1001. Herein, reception of the data symbols is determined according to a frame structure. Therefore, by determining whether it is a frame duration in which the data symbols are received, the receiving end determines whether the data symbols are received.

Upon receiving the data symbols, proceeding to block 1003, the receiving end determines whether the pilot signals included in the data symbols are common pilots or dedicated pilots. Whether the pilot signals are the common pilots or the dedicated pilots is determined according to a condition negotiated previously between a transmitting end and the receiving end. Therefore, the receiving end determines whether the pilot signals are the common pilots or the dedicated pilots by confirming the configuration determined through the negotiation. The dedicated pilot implies a pilot signal only for the receiving end to which precoding for the receiving end is applied. The common pilot implies a pilot signal for all receiving ends to which the precoding is not applied.

If the pilot signals are the common pilots, proceeding to block 1005, the receiving end performs time-axis linear interpolation and IIR filtering. That is, by using received values of the pilot signals, the receiving end determines values obtained as a result of the time-axis linear interpolation and IIR filtering performed on data tones in a subcarrier on which the pilot signals are located. In this situation, the time-axis linear interpolation and the IIR filtering are performed within a block range having a predetermined size. For example, the time-axis linear interpolation and the IIR filtering are performed by using four (4) multipliers and two (2) adders as illustrated in FIG. 8 above. In block 1005, the resultant values of the time-axis linear interpolation and IIR filtering for the data tones in the subcarrier on which the pilot signals are located, i.e., input values of an N-tap filter for the second type, are determined.

In block 1007, the receiving end loads coefficient sets for the second type. The coefficient sets for the second type are used to perform frequency-axis linear interpolation and FIR filtering by using the N-tap filter, and corresponding sets exist in respective positions of data tones. For example, the coefficient sets for the second type are determined by Equation 3. The coefficient sets for the second type may be predetermined and stored in the receiving end. In block 1007, the receiving end loads the stored coefficient sets.

After loading the coefficient sets, proceeding to block 1009, the receiving end determines channel estimation values of the data tones by applying the coefficient sets to the N-tap filter. For example, the channel estimation values of the data tones are obtained by using N multipliers and (N−1) adders as illustrated in FIG. 9 above. In this situation, the N multipliers and the (N−1) adders are also used not only for the second-type channel estimation but also for the first-type channel estimation and the third-type channel estimation.

If it is determined in block 1003 that the pilot signals included in the data symbols are the dedicated pilots, proceeding to block 1011, the receiving end determines whether reliability of a channel parameter is greater than or equal to a threshold. The channel parameter includes a Doppler frequency, delay spreading, noise power, and such. The reliability of the channel parameter is determined by the number of samples used to obtain the channel parameter, a variation of the channel parameter value, and such. That is, the receiving end calculates the reliability value by using the number of samples used to calculate the channel parameter, the variation of the channel parameter value, and such, and then determines whether the reliability value is greater than a specific threshold.

If the reliability of the channel parameter is greater than or equal to the threshold, proceeding to block 1013, the receiving end loads the coefficient sets for the first type. The coefficient sets for the first type are used to perform a Wiener-type channel estimation through the N-tap filter, and corresponding sets exist in respective positions of data tones. For example, the coefficient sets for the first type are determined by Equation 1. The coefficient sets for the first type may be predetermined and stored in the receiving end. In block 1013, the receiving end loads the stored coefficient sets. Subsequently, the procedure proceeds to block 1009.

Otherwise, if the reliability of the channel parameter is less than the threshold, proceeding to block 1015, the receiving end loads the coefficient sets for the third type. The coefficient sets for the third type are used to perform the time-axis linear interpolation and the frequency-axis linear interpolation through the N-tap filter, and corresponding sets exist in respective positions of data tones. For example, the coefficient sets for the third type are determined by Equation 4. The coefficient sets for the third type may be predetermined and stored in the receiving end. In block 1015, the receiving end loads the stored coefficient sets. Subsequently, the procedure proceeds to block 1009.

According to embodiments of the present invention, a wireless communication system expresses various coefficients for FIR filtering with respect to pilot signals, and thus the number of coefficients for the FIR filtering can be decreased to be equal to the number of coefficients for Wiener channel estimation. Therefore, various types of channel estimation can be implemented by using a common hardware component.

What is claimed is:

1. An apparatus for estimating a channel in a wireless communication system, the apparatus comprising:
a storage unit configured to store coefficient sets for each of a plurality of channel estimation types;
a controller configured to select one of the plurality of channel estimation types according to at least one of a type of a pilot signal and a reliability value of a channel parameter; and
an N-tap filter configured to determine channel estimation values of data tones by using the coefficient sets for the selected channel estimation type,
wherein the plurality of channel estimation types comprise at least two of:
a first type comprising a Wiener type which uses coefficients determined by using Doppler frequency, delay spreading, and noise power,
a second type comprising time-axis linear interpolation, time-axis Infinite Impulse Response (IIR) filtering, frequency-axis linear interpolation, and frequency-axis Finite Impulse Response (FIR) filtering, and
a third type comprising the time-axis linear interpolation and the frequency-axis linear interpolation.

2. The apparatus of claim 1, further comprising:
an operator configured to determine input values of the N-tap filter for the second type by performing the time-axis linear interpolation and the IIR filtering using received values of pilot signals.

3. The apparatus of claim 2, wherein the operator comprises:
a first plurality of multipliers and at least one first adder for the time-axis linear interpolation; and
a second plurality of multipliers and at least one second adder for the IIR filtering.

4. The apparatus of claim 3,
wherein the first plurality of multipliers for the time-axis linear interpolation multiply a received value of a pilot signal of a $k^{th}$ subcarrier and an $n^{th}$ symbol and a received value of a pilot signal of the $k^{th}$ subcarrier and an $(n+1)^{th}$ symbol by $(L-1)/L$ and $1/L$, respectively, and
wherein the at least one first adder for the time-axis liner interpolation calculates a channel estimation value of a data tone of the $k^{th}$ subcarrier and the $(n+1)^{th}$ symbol by summing outputs of the first multipliers for the time-axis interpolation.

5. The apparatus of claim 3,
wherein the second plurality of multipliers for the IIR filtering multiply a channel estimation value of a tone of a $k^{th}$ subcarrier and an $(n+1)^{th}$ symbol and a channel estimation value of a tone of the $k^{th}$ subcarrier and an $(n+L-1)^{th}$ symbol by a and $(1-\alpha)$, respectively, and
wherein the at least one second adder for the IIR filtering determines a channel estimation value of a tone of the IIR-filtered $k^{th}$ subcarrier and $(n+1)^{th}$ symbol by summing outputs of the second multipliers for the IIR filtering.

6. The apparatus of claim 1, wherein the channel parameter comprises at least one of the Doppler frequency, the delay spreading, and the noise power.

7. The apparatus of claim 6, wherein the reliability value is increased in proportion to the number of samples used to obtain the channel parameter and in inverse proportion to the variation of the channel parameter value.

8. The apparatus of claim 1, wherein:
if a dedicated pilot is received as a pilot signal for only one receiving end to which precoding for the receiving end is applied and the reliability value is greater than or equal to a threshold, the controller selects the first type,
if a common pilot is received as a pilot signal for all receiving ends to which the precoding is not applied, the controller selects the second type, and
if a dedicated pilot is received as a pilot signal for only one receiving end to which precoding for the receiving end is applied and the reliability value is less than the threshold, the controller selects the third type.

9. The apparatus of claim 1, wherein the N-tap filter comprises N multipliers and (N−1) adders.

10. A method of estimating a channel in a wireless communication system, the method comprising:
selecting one of a plurality of channel estimation types according to at least one of a type of a pilot signal and a reliability value of a channel parameter; and
determining channel estimation values of data tones through an N-tap filter to which coefficient sets for the selected channel estimation type is applied,
wherein the plurality of channel estimation types comprise at least two of:
a first type comprising a Wiener type which uses coefficients determined by using Doppler frequency, delay spreading, and noise power,
a second type comprising time-axis linear interpolation, time-axis Infinite Impulse Response (IIR) filtering, frequency-axis linear interpolation, and frequency-axis Finite Impulse Response (FIR) filtering, and
a third type comprising the time-axis linear interpolation and the frequency-axis linear interpolation.

11. The method of claim 10, further comprising:
  determining input values of the N-tap filter for the second type by performing the time-axis linear interpolation and the IIR filtering using received values of pilot signals.

12. The method of claim 11, wherein determining the input values of the N-tap filter for the second type comprises:
  multiplying a received value of a pilot signal of a $k^{th}$ subcarrier and an $n^{th}$ symbol and a received value of a pilot signal of the $k^{th}$ subcarrier and an $(n+1)^{th}$ symbol by $(L-1)/L$ and $1/L$, respectively, and
  calculating a channel estimation value of a data tone of the $k^{th}$ subcarrier and the $(n+1)^{th}$ symbol by summing pilot signals' received values multiplied by $(L-1)/L$ and $1/L$, respectively.

13. The method of claim 11, wherein determining the input values of the N-tap filter for the second type comprises:
  multiplying a channel estimation value of a tone of a $k^{th}$ subcarrier and an $(n+1)^{th}$ symbol and a channel estimation value of a tone of the $k^{th}$ subcarrier and an $(n+L-1)^{th}$ symbol by $\alpha$ and $(1-\alpha)$, respectively; and
  determining a channel estimation value of a tone of the IIR-filtered $k^{th}$ subcarrier and $(n+1)^{th}$ symbol by summing the channel estimation values multiplied by $\alpha$ and $(1-\alpha)$, respectively.

14. The method of claim 10, wherein the channel parameter comprises at least one of the Doppler frequency, the delay spreading, and the noise power.

15. The method of claim 14, wherein the reliability value is increased in proportion to the number of samples used to obtain the channel parameter and in inverse proportion to the variation of the channel parameter value.

16. The method of claim 10, wherein selecting one of the plurality of channel estimation types comprises:
  selecting the first type if a dedicated pilot is received as a pilot signal for only one receiving end to which precoding for the receiving end is applied and the reliability value is greater than or equal to a threshold;
  selecting the second type if a common pilot is received as a pilot signal for all receiving ends to which the precoding is not applied; and
  selecting the third type if the dedicated pilot is received and the reliability value is less than the threshold.

17. The method of claim 10, wherein the N-tap filter includes N multipliers and (N-1) adders.

18. An apparatus for estimating a channel in a wireless communication system, the apparatus comprising:
  a controller configured to select one of a plurality of channel estimation types according to at least one of a type of a pilot signal and a reliability value of a channel parameter, the plurality of channel estimation types comprising at least two of:
    a first type comprising a Wiener type which uses coefficients determined by using Doppler frequency, delay spreading, and noise power,
    a second type comprising time-axis linear interpolation, time-axis Infinite Impulse Response (IIR) filtering, frequency-axis linear interpolation, and frequency-axis Finite Impulse Response (FIR) filtering, and
    a third type comprising the time-axis linear interpolation and the frequency-axis linear interpolation;
  an N-tap filter configured to determine channel estimation values of data tones by using the coefficient sets for the selected channel estimation type; and
  an operator configured to determine input values of the N-tap filter by performing the time-axis linear interpolation and the IIR filtering using received values of pilot signals when the second type is selected.

19. The apparatus of claim 18, wherein:
  if a dedicated pilot is received as a pilot signal for only one receiving end to which precoding for the receiving end is applied and the reliability value is greater than or equal to a threshold, the controller selects the first type,
  if a common pilot is received as a pilot signal for all receiving ends to which the precoding is not applied the controller selects the second type, and
  if a dedicated pilot is received as a pilot signal for only one receiving end to which precoding for the receiving end is applied and the reliability value is less than the threshold, the controller selects the third type.

20. The apparatus of claim 19, further comprising a storage unit configured to store coefficient sets for each of the plurality of channel estimation types,
  wherein if the first type is selected, the N-tap filter determines a final channel estimation value based on the received values of pilot signals from the controller and coefficient sets for the first type from the storage unit,
  wherein if the second type is selected, the N-tap filter determines the final channel estimation value based on input values from the operator and coefficient sets for the second type from the storage unit, and
  wherein if the third type is selected, the N-tap filter determines the final channel estimation value based on the received values of pilot signals from the controller and coefficient sets for the third type from the storage unit.

* * * * *